No. 669,377. Patented Mar. 5, 1901.
A. M. BACON.
COKE DRAWING APPARATUS.
(Application filed May 5, 1900.)
(No Model.)
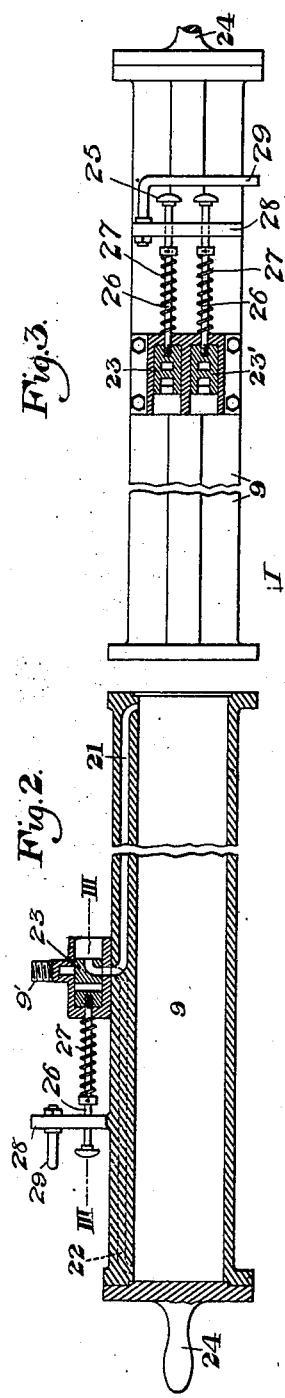
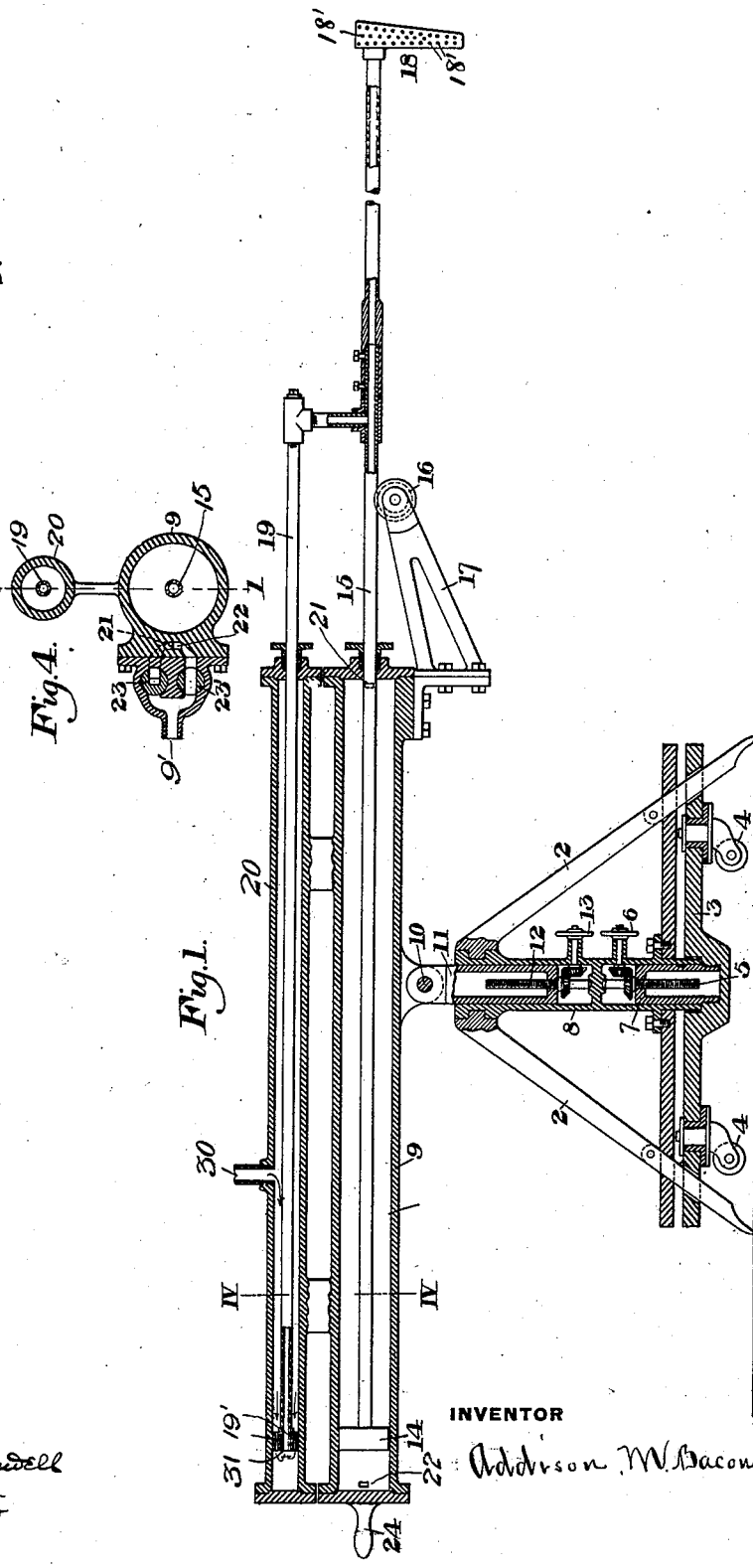
WITNESSES
INVENTOR
Addison M. Bacon.

UNITED STATES PATENT OFFICE.

ADDISON M. BACON, OF PITTSBURG, PENNSYLVANIA.

COKE-DRAWING APPARATUS.

SPECIFICATION forming part of Letters Patent No. 669,377, dated March 5, 1901.

Application filed May 5, 1900. Serial No. 15,609. (No model.)

*To all whom it may concern:*

Be it known that I, ADDISON M. BACON, of Pittsburg, in the county of Allegheny and State of Pennsylvania, have invented a new and useful Improvement in Coke-Drawing Apparatus, of which the following is a full, clear, and exact description, reference being had to the accompanying drawings, forming part of this specification, in which—

Figure 1 shows in side elevation on line I I of Fig. 4, partly in vertical section, coke-drawing apparatus constructed in accordance with my invention. Fig. 2 is a horizontal longitudinal section showing the cylinder and valve. Fig. 3 is a side elevation, partly in vertical section on the line III III of Fig. 2, showing the relative arrangement of the valve. Fig. 4 is a vertical cross-section on the line IV IV of Fig. 1.

In the drawings, 2 represents a stationary support for my improved drawing device, which is formed with legs suitably arranged to hold the apparatus in fixed position.

3 is a supplemental support provided with wheels or casters 4 and arranged to be vertically movable preferably by means of a screw 5, operated by a hand-wheel 6 and working in a nut 7, which carries the supports 3 and is arranged to be rotatory and vertically movable in a sleeve 8, which is fixed to or forms part of the support 2. By turning the wheel 6 so as to move the support 3 downwardly against the ground said support may be caused to bear the weight of the machine, and being mounted on wheels renders the machine easily portable from place to place. By raising the support 3 the weight of the machine is caused to be borne by the fixed support 2, as shown in Fig. 1, in which position it is ready for drawing the charge from an adjacent coke-oven. The motive cylinder 9, by which the drawing-tool is operated, is pivoted at 10 to a shank 11, which is vertically movable in the sleeve 8 by a screw 12 and a hand-wheel 13, so that the elevation of the cylinder above the ground may be regulated as desired. The cylinder 9 contains a piston or plunger 14, whose rod 15 is preferably supported at the exterior of the cylinder by a wheel 16 on a bracket 17, and this rod carries the drawing tool or fork 18. This latter is made hollow and is provided with perforations 18' at the end thereof for the discharge of water supplied to it through the rod 15, which is hollow and is connected to a supply-pipe 19, forming a telescopic water connection with cylinder 20, so that the water may be supplied to it by means of inlet-port 30 and passages 31 in guide 19' on the end of pipe 19 in all positions of the said pipe 19, the course of the water being indicated by arrows, as shown.

A motive fluid is supplied to the cylinder 9 through supply-pipe 9' and ports 21 and 22, which are controlled by valves 23 23', operated by thumb-pieces 25 on rods 26, which rods are provided with compression-springs 27, so that by moving the appropriate valve the piston may be projected or retracted, as desired. A suitable standard 28, secured to cylinder 9, is provided, in which rods 26 move and to which a hand-rest 29 is secured. The cylinder 9 is preferably formed with a convenient handle 24, enabling the operator to tip the cylinder vertically on the axis 10 to the desired angle or to swing it horizontally on the vertical axis of the shank 11, thus enabling him to have complete control of the drawing-tool.

The operation is as follows: When it is desired to draw the charge of coke from an oven, the apparatus is moved so as to direct the cylinder toward the oven-door, and the cylinder having been adjusted to the proper height and inclination the plunger by manipulation of the valves is projected, so as to introduce the tool into the oven, and then is retracted, so as to withdraw the coke engaged by the tool. During the withdrawal a stream of water is discharged through the rod 15, which prevents the drawing-tool from burning, and as soon as the coke is drawn to the exterior of the furnace a supply of water is discharged upon it. By introducing the tool into the oven and withdrawing it, as just described, the oven can be rapidly discharged of its coke without first wetting it with water, which is the present practice with hand-operated tools and which is detrimental, not only on account of the loss of time and of heat, but also because of the injury which it does to the oven structure, and during this operation the workman steers and directs the tool as required. The apparatus enables an oven to be drawn while it is still hot. This is of advantage, because it enables the next charge to be introduced into the oven while hot, and the coking operation will therefore begin at once without the waste of heat and large percentage of ash created when the oven has to be reheated.

Within the scope of my invention as defined in the claims the apparatus may be modified in various ways, since

What I claim is—

1. Coke-drawing apparatus comprising a drawing-tool, means for projecting and retracting it, and means for passing a stream of water to the tool; substantially as described.

2. A coke-drawing apparatus comprising a cylinder pivotally movable in a vertical plane, and horizontally oscillatory, a drawing-tool adapted to be moved by the cylinder, a water-supply cylinder mounted thereon, and a supply-pipe connected with said tool and arranged to reciprocate in said supply-cylinder; substantially as described.

3. A coke-drawing apparatus comprising a fixed support, a supplemental support on which the apparatus may be moved, means for moving one of the said supports vertically, a hollow drawing-tool adapted to be projected and retracted on said support, and means for passing a stream of water to said tool; substantially as described.

In testimony whereof I have hereunto set my hand.

ADDISON M. BACON.

Witnesses:
H. M. CORWIN,
GEO. B. BLEMING.